United States Patent
Moine et al.

(10) Patent No.: US 11,821,354 B2
(45) Date of Patent: Nov. 21, 2023

(54) COMPRESSED AIR GENERATION SYSTEM AND AUTOMOTIVE VEHICLE COMPRISING SUCH A SYSTEM

(71) Applicant: VOLVO TRUCK CORPORATION, Gothenburg (SE)

(72) Inventors: Nicolas Moine, Lyons (FR); David Guerin, Vernaison (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/282,219

(22) PCT Filed: Oct. 12, 2018

(86) PCT No.: PCT/EP2018/077933
§ 371 (c)(1),
(2) Date: Apr. 1, 2021

(87) PCT Pub. No.: WO2020/074103
PCT Pub. Date: Apr. 16, 2020

(65) Prior Publication Data
US 2021/0332744 A1 Oct. 28, 2021

(51) Int. Cl.
*F02B 21/00* (2006.01)
*B60T 17/02* (2006.01)
(Continued)

(52) U.S. Cl.
CPC .............. *F02B 21/00* (2013.01); *F02B 37/12* (2013.01); *F02D 41/0007* (2013.01);
(Continued)

(58) Field of Classification Search
CPC .......... F02B 21/00; F02B 37/12; F02B 37/00; F02B 37/164; F02D 41/0007;
(Continued)

(56) References Cited

U.S. PATENT DOCUMENTS 3,658,082 A * 4/1972 DiTirro ................ G05D 16/187
137/484.8
4,496,291 A 1/1985 Grimmer
(Continued)

FOREIGN PATENT DOCUMENTS

DE 19637571 A1 3/1998
EP 2651735 A1 10/2013
JP S59117864 U 8/1984

OTHER PUBLICATIONS

International Search Report and Written Opinion dated May 13, 2019 in corresponding International PCT Application No. PCT/EP2018/077933, 10 pages.
(Continued)

*Primary Examiner* — J. Todd Newton
(74) *Attorney, Agent, or Firm* — Venable LLP; Jeffri A. Kaminski (57) ABSTRACT

This compressed air generation system (12) for an automotive vehicle (V) comprises: —a turbocompressor (4) feeding an internal combustion engine (2) of the automotive vehicle (V) with compressed air, —an air compressor (8), —at least one compressed air tank (10) connected to an outlet pipe (82) of the air compressor (8), the air compressor (8) comprising an inlet pipe (80) fed with compressed air from the turbocompressor (4). The compressed air generation system (12) comprises a pressure regulator (14) placed downstream the turbocompressor (4) and upstream the air compressor (8) and which limits the pressure (P8) of the compressed air fed from the turbocompressor (4) to the air compressor (8) to a first threshold (T1).

13 Claims, 8 Drawing Sheets

(51) Int. Cl.
   *F02B 37/12*   (2006.01)
   *F02D 41/00*   (2006.01)
   *F02M 35/10*   (2006.01)

(52) U.S. Cl.
   CPC .............. *F02M 35/10209* (2013.01); *F02M 35/10255* (2013.01); *F02M 35/10373* (2013.01); *B60T 17/02* (2013.01)

(58) Field of Classification Search
   CPC ....... F02M 35/10209; F02M 35/10255; F02M 35/10373; F02M 35/10229; F02M 35/10236; F02M 35/164; B60T 17/02; B60T 17/06
   USPC ....................................................... 60/605.1
   See application file for complete search history.

(56) References Cited

U.S. PATENT DOCUMENTS

| | | | | |
|---|---|---|---|---|
| 4,652,216 | A * | 3/1987 | Eslinger | B60T 17/02 417/252 |
| 4,745,904 | A * | 5/1988 | Cagle | F02M 37/0029 123/512 |
| 5,178,799 | A * | 1/1993 | Brown | B01F 35/2115 261/DIG. 7 |
| 5,372,159 | A * | 12/1994 | Ziegelmeyer | G05D 16/0669 123/512 |
| 6,986,338 | B2 * | 1/2006 | Gotthelf | G05D 16/187 123/460 |
| 2009/0235663 | A1 * | 9/2009 | Nemeth | F02B 21/00 60/605.2 |
| 2011/0132335 | A1 * | 6/2011 | Pursifull | F02D 23/00 137/565.17 |
| 2011/0283976 | A1 * | 11/2011 | Schaffeld | F02D 41/0007 123/568.11 |
| 2012/0090580 | A1 * | 4/2012 | Hu | F02D 23/00 123/564 |
| 2013/0152580 | A1 | 6/2013 | Marx et al. | |
| 2017/0226942 | A1 * | 8/2017 | Denner | F02B 37/004 |
| 2021/0332744 | A1 * | 10/2021 | Moine | F02B 21/00 |

OTHER PUBLICATIONS

European Communication pursuant to Article 94(3) EPC dated Mar. 31, 2023 in corresponding European Patent Application No. 18789045.4, 5 pages.

* cited by examiner

COMPRESSED AIR GENERATION SYSTEM AND AUTOMOTIVE VEHICLE COMPRISING SUCH A SYSTEM

CROSS-REFERENCE TO RELATED APPLICATIONS

This application is a U.S. National Stage application of PCT/EP2018/077933, filed Oct. 12, 2018, and published on Apr. 16, 2020, as WO 2020/074103 A1, all of which is hereby incorporated by reference in its entirety.

TECHNICAL FIELD

The present invention concerns a compressed air generation system for an automotive vehicle, and an automotive vehicle, such as a truck, comprising such a compressed air generation system.

BACKGROUND

Automotive vehicles, such as trucks, are equipped with air compressors for feeding some auxiliary systems, such as braking systems, with compressed air. To increase the air delivery and reduce the power consumption of the air compressors, it is known to feed the air compressor with compressed air produced by a turbocompressor of the vehicle. This allows operating the air compressor at a lower compression rate. Such technique is for instance described in DE 19637571, in which compressed air is delivered to the air compressor from the turbocompressor if enough compressed air is available.

Air compressors are designed to work in a predetermined air pressure range. The compressed air delivered by the turbocompressor may have pressure peaks depending on the operation conditions of the internal combustion engine of the vehicle. If the air compressor is fed with air pressures that are above the maximal pressure value of the pressure range, the air compressor may be damaged.

To withstand pressure peaks, the compression ratio of the air compressor should be reduced, and internal component be reinforced to accept addition constraint. If the turbocompressor does not deliver enough pressured air (for example when the engine is idle) to the air compressor with reduces compression ratio, the compression efficiency may be low, leading to increased filling time of the air tanks and fuel overconsumption.

SUMMARY

The aim of the invention is to provide a compressed air generation system in which the operation of the air compressor is optimized to withstand overpressure peaks in the compressed air delivered by the turbocompressor and avoid power overconsumption.

To this end, the invention concerns a compressed air generation system for an automotive vehicle, comprising:
  a turbocompressor feeding an internal combustion engine of the automotive vehicle with compressed air,
  an air compressor,
  at least one compressed air tank connected to an outlet pipe of the air compressor, the air compressor comprising an inlet pipe fed with compressed air from the turbocompressor.

This compressed air generation system is characterized in that it comprises a pressure regulator placed downstream the turbocompressor and upstream the air compressor and which limits the pressure of the compressed air fed from the turbocompressor to the air compressor to a first threshold.

Thanks to the invention, the pressure peaks from the turbocompressor are cut below a predetermined threshold depending on the pressure range of the air compressor, avoiding damage on the air compressor.

According to other aspects of the invention which are advantageous but not compulsory, such a flow pressure regulator may incorporate one or several of the following features:
  The compressed air generation system comprises a tank sensor adapted to detect the quantity of compressed air contained in the air tank, and a controlled valve adapted to close the feeding of the inlet pipe of the air compressor with the turbocompressor if the tank sensor detects that the air tank is full.
  The controlled valve is formed by the pressure regulator that can be closed, and the pressure regulator comprises a controllable actuator adapted to close the pressure regulator whatever the pressure upstream the pressure regulator and the pressure downstream the pressure regulator.
  The controllable actuator is a pressure-controlled piston which closes the pressure regulator.
  In the absence of control pressure acting on the pressure controlled piston, the pressure regulator is open.
  The controlled valve is a valve connected on the inlet pipe of the air compressor upstream the pressure regulator.
  The air compressor is able to be stopped or placed in a rest mode when the tank sensor detects that the air tank is full.
  The compressed air generation system comprises a pressure relief valve adapted to release to the atmosphere compressed air accumulated between the pressure regulator and the air compressor.
  The pressure relief valve is provided in the pressure regulator and formed by a shutter and a part of a piston of the pressure regulator that is movable with respect to the shutter under action of the pressure between the pressure regulator and the compressor, and when the pressure regulator is closed and when the pressure between the pressure regulator and the air compressor becomes superior to a second threshold, inferior to the first threshold, a central channel of the part of the movable piston, that communicates with the atmosphere, is open by a movement of the part of the movable piston away from the shutter.
  The pressure relief valve is formed by a valve connected on the inlet pipe of the air compressor downstream the pressure regulator.
  The pressure regulator is connected to the inlet pipe of the air compressor.
  The compressed air generation system comprises means to force the opening of the pressure regulator and activate the air compressor so that a temperature of exhaust gases of the engine of the vehicle is increased.
  The compressed air generation system comprises means to change cut-in and cut-off pressure thresholds of the air tank.
  The compressed air generation system comprises a discharge valve connected on the outlet pipe of the air compressor which is opened during forced opening of the pressure regulator and activation of the air compressor.
  The compressed air generation system comprises a control unit for controlling at least:

a controlled valve adapted to close the feeding of the inlet pipe of the air compressor with the turbocompressor if a tank sensor of the compressed air generation system detects that the air tank is full;

a pressure relief valve adapted to release to the atmosphere compressed air accumulated between the pressure regulator and the air compressor;

the operation of the air compressor;

cut-in and cut-off pressure thresholds of the air tank;

a discharge valve connected on the outlet pipe of the air compressor which is opened during forced opening of the pressure regulator and activation of the air compressor.

The invention also concerns an automotive vehicle comprising a compressed air generation system as mentioned here-above.

BRIEF DESCRIPTION OF THE DRAWINGS

The invention will now be explained in reference to the annexed drawings, as an illustrative example. In the annexed drawings.

DETAILED DESCRIPTION OF EXAMPLE EMBODIMENTS OF THE INVENTION

Figure 1:
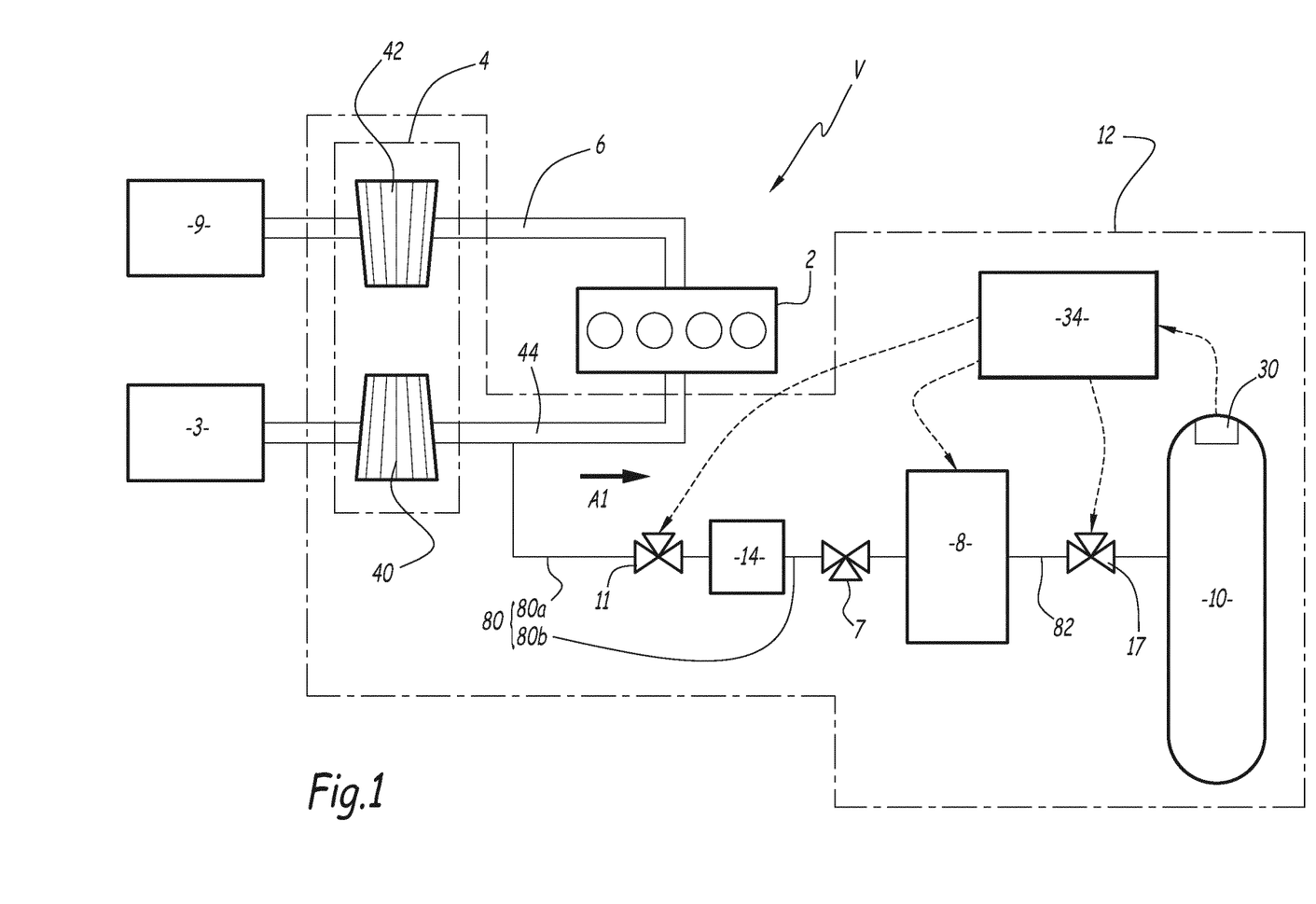
FIG. 1 is a schematic view of a compressed air generation system according to the invention.

An automotive vehicle V, such as a truck, represented on FIG. 1 comprises an internal combustion engine 2 adapted to be fed with compressed air produced by a turbocompressor 4. The turbocompressor 4 produces compressed air from air at atmospheric pressure thanks to a compressor 40 which is driven by a turbine 42, the latter using the energy of exhaust gases flowing in an exhaust line 6 of the vehicle V. Air at atmospheric pressure is extracted from the outside of the vehicle V with an air filter 3. Compressed air is driven, as shown by arrows A1, from the turbocompressor 4 to the engine 2 through an air intake pipe 44.

The vehicle V comprises an air compressor 8. For example, the air compressor 8 can be a piston compressor.

The air compressor 8 is adapted to feed a compressed air tank 10 in which compressed air is stored in order to feed one or several pneumatically driven sub-systems of the vehicle V, such as a non-shown braking system.

The air compressor 8 is adapted to compress air provided by the turbocompressor 4. The air compressor 8 is fed by an inlet pipe 80 which originates from the air intake pipe 44. Compressed air is fed to the tank 10 via an outlet pipe 82 of the air compressor 8.

The air compressor 8, the turbocompressor 4 and the air tank 10 form together a compressed air generation system 12.

The compressed air generation system 12 comprises a pressure regulator 14 connected upstream the air compressor 8 and which limits the pressure P4 of the compressed air fed from the turbocompressor 4 to the air compressor 8. As represented on FIG. 4, this allows limiting the intake pressure P8 of the air compressor 8 below a first threshold T1 corresponding to a maximal intake pressure of the air compressor 8, which is a data inherent to the design of the air compressor 8. For example, the air compressor 8 may be designed to compress air at a pressure of 12.5 bar from air at a pressure between 1 to 3 bar. If the air compressor 8 was fed with an intake pressure of 5 bar superior to this maximal intake pressure of 3 bar, the air compressor 8 would risk damages. Pressure peaks in the compressed air delivered by the turbocompressor 4, shown on FIG. 3, are therefore not able to damage the air compressor 8, and the air compressor 8 does not need to be designed with a lower compression ratio that would incur higher power consumption and reduced performance.

Figure 2:
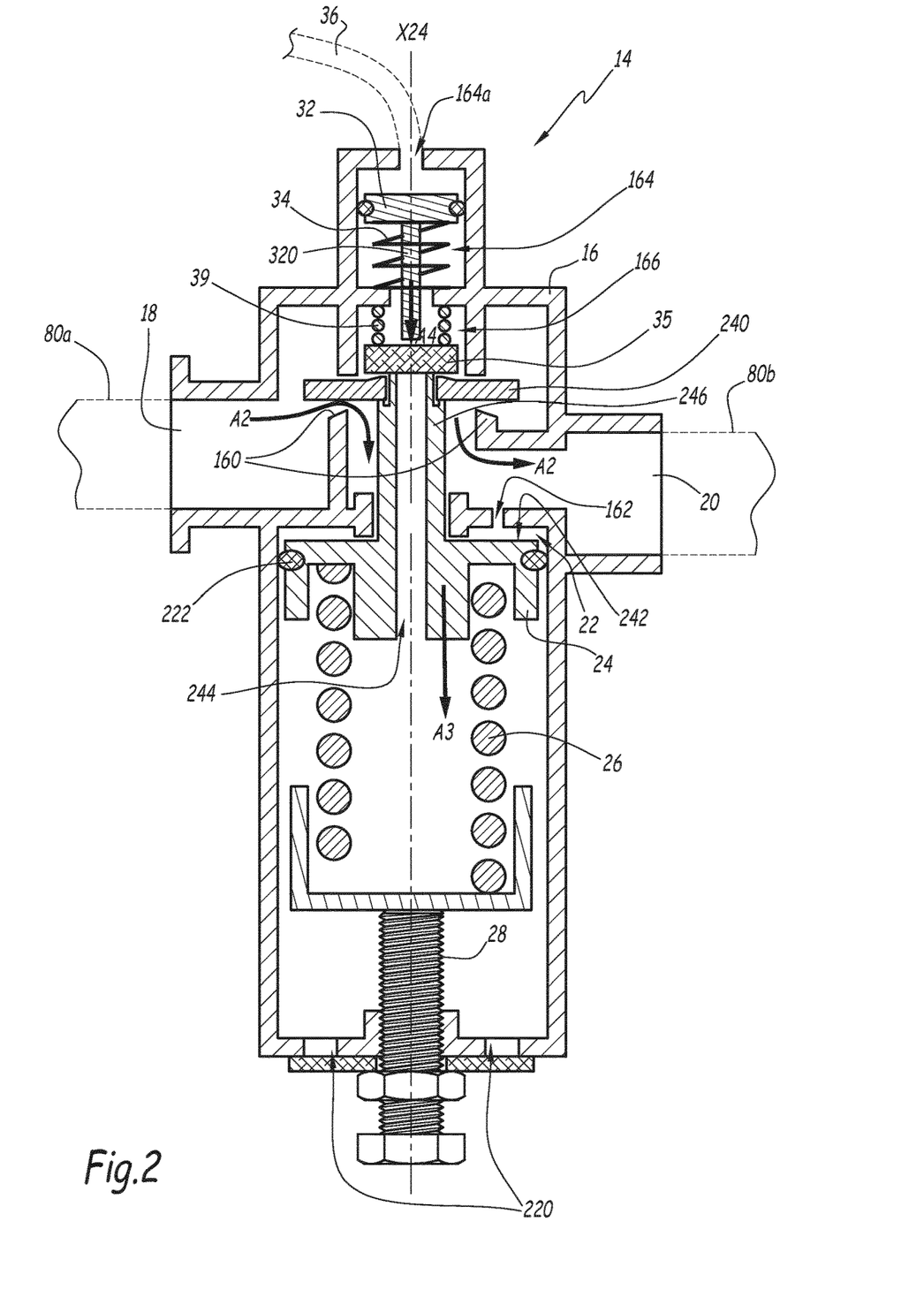
FIG. 2 is a transversal sectional view of a pressure regulator of the compressed air generation system of FIG. 1, in an open configuration.
Figure 3:
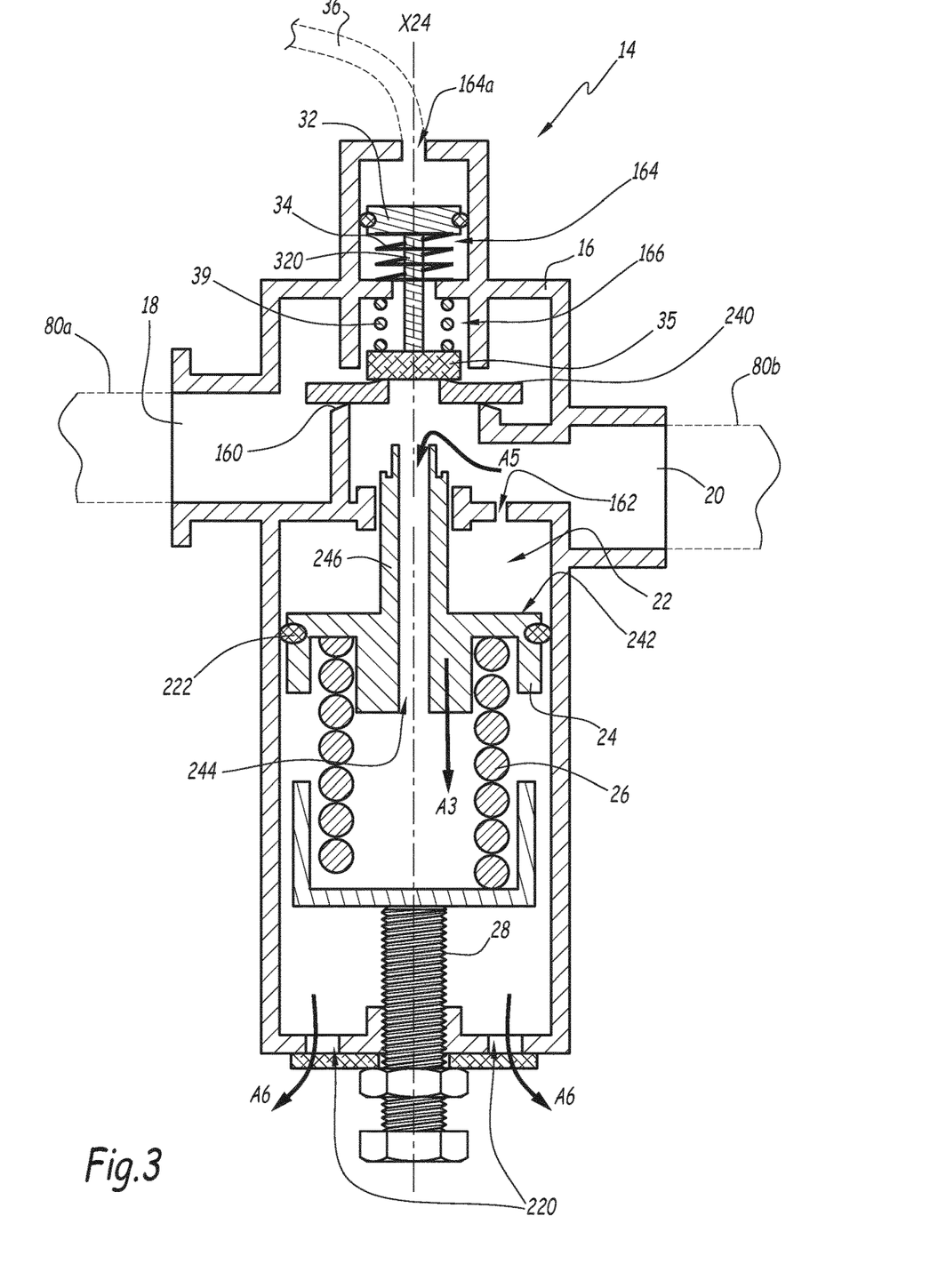
FIG. 3 is a view similar to FIG. 2, is a closed configuration of the pressure regulator.

The pressure regulator 14 is represented on FIGS. 2 and 3. The pressure regulator 14 comprises a valve body 16 on which are provided an intake port 18 connected to a first section 80a of the inlet pipe 80, and an outlet port 20 connected to a second section 80b of the inlet pipe 80. The pressure regulator 14 comprises a central chamber 22 in which is mounted a piston 24. The piston 24 is movable in translation along a central longitudinal axis X24, which also forms a central longitudinal axis of the central chamber 22.

The piston 24 comprises a collar 240 adapted to make contact with a valve seat 160 of the valve body 16 to close passage of air from the intake port 18 towards the outlet port 20. Non-shown sealing gaskets may be provided on the collar 240 to tighten contact with the seat 160.

When the pressure regulator 14 is open (FIG. 2), air flows around the collar 240 towards the outlet port 20, as shown by arrows A2. Near the outlet port 20, the valve body 16 comprises a calibrated hole 162 which puts into fluid communication the chamber 22 with the outlet port 20 at a defined flow. The pressure in the outlet port 20 therefore exerts a force on an active surface 242 of the piston 24, against the biasing force of a spring 26 of the pressure regulator 14, which urges the piston 24 upwards so that the collar 240 is driven away from the seat 160. The force of the spring 26 can be modified using a screw 28.

Depending on the air pressure, equal to the pressure P4, in the intake port 18, which communicates with the chamber 22 via the outlet port 20 and the hole 162, the piston 24 is driven downwards along arrow A3, resulting in the collar 240 getting closer to the seat 160 and limiting the air pressure that flows into the outlet port 20, equal to the intake pressure P8 of the air compressor 8.

The compressed air generation system 12 comprises a tank sensor 30 adapted to detect the quantity of compressed air contained in the air tank 10, and a controlled valve adapted to close the feeding of the inlet pipe 80 of the air compressor 8 with the turbocompressor 4 if the tank sensor 30 detects that the air tank 10 is full. The tank sensor 30 may be a pressure sensor adapted to measure the air pressure P10 in the tank 10. During filling of the air tank 10, the air pressure P10 of the air tank 10 progressively increases up to a maximal pressure Pmax.

The controlled valve is formed by the pressure regulator 14 that can be closed. The pressure regulator 14 comprises a controllable actuator adapted to close the pressure regulator 14 whatever the respective pressures P4 and P8 in the inlet port 18 and the outlet port 20.

The controllable actuator is a pressure-controlled piston 32 which closes the pressure regulator 14 by acting to move the piston 24 towards a closed position shown on FIG. 3

Figure 4:
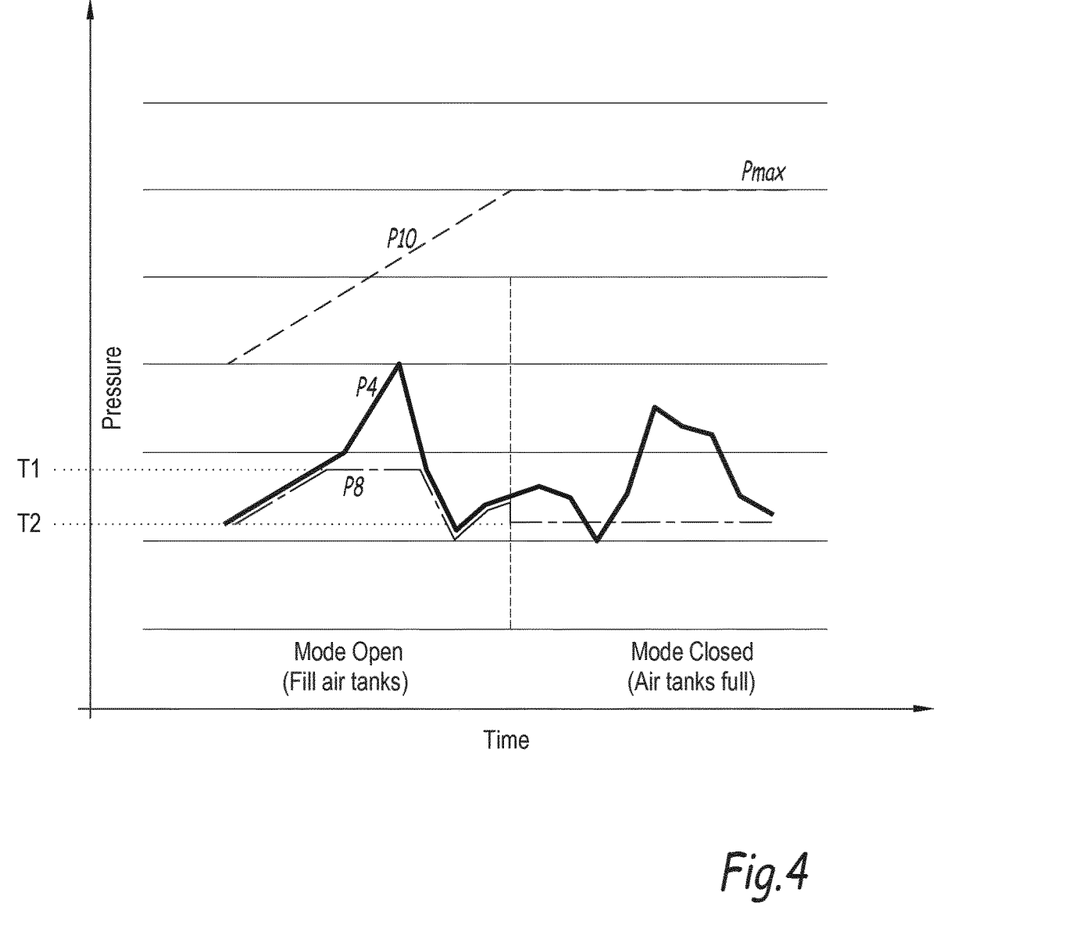
FIG. 4 is a pressure chart describing the operation of the invention

("Mode closed" on FIG. 4). The piston 32 is housed in an auxiliary chamber 164 of the valve body 16. The auxiliary chamber 164 comprises a hole 164a through which a control air pressure is injected in the chamber 164 to urge the piston 32 downwards to act, with a rod 320 of the piston 32 extending along the central axis X24, on the piston 24, as shown by arrow A4. In such a case, the piston 32 directly acts on the piston 24 to close the pressure regulator 14.

In the absence of control pressure acting on the pressure controlled piston 32, the pressure controlled piston 32 is urged upwards, towards its position of FIG. 2, by a spring 34. The piston 32 does therefore not act on the piston 24, and the pressure regulator 14 is therefore not closed by the piston 32. The pressure regulator 14 is still able to be closed depending on the air pressures in the inlet and outlet ports 18 and 20.

The closing of the pressure regulator 14 if the air tank 10 is full avoids operation of the air compressor 8 while air compression is not useful. The closing of compressed air feeding of the air compressor 8 from the turbocompressor 4 avoids operation of the air compressor 8 while it is not desired. From the closing of the pressure regulator, the pressure P10 remains steady at value Pmax.

The compressed air generation system 12 may comprise a control unit 34 able to receive signals from the tank sensor 30, and to control the pressure regulator 14 via a pneumatic control pipe 36 connected to the hole 164a. The control unit 34 may include electronic and/or pneumatic components.

In order to guarantee that the air compressor 8 does not operate while the air tank 10 is full, the air compressor 8 is able to be stopped or placed in a rest mode when the tank sensor 30 detects that the air tank 10 is full. This control of the air compressor 8 may be operated with the control unit 34 via an electric signal. The control unit 34 may also be able to control any other working parameter of the air compressor 8.

According to an embodiment, the controlled valve may be distinct from the pressure regulator 14 and be formed by a valve 11, for example a three-way valve, connected on the first section 80a of the inlet pipe 80, upstream the pressure regulator 14. The valve 11 may be controlled by the control unit 34.

The pressure regulator 14 comprises a pressure relief valve adapted to release to the atmosphere compressed air accumulated between the pressure regulator 14 and the air compressor 8, in other words, in the second section 80b of the inlet pipe 80.

For example, as represented on FIGS. 2 and 3, the pressure regulator 14 may comprise a movable shutter 35 housed in another chamber 166 of the valve body 16, which is in fluid communication with the inlet port 18 and the outlet port 20, with the chamber 164, and with a central channel 244 of the piston 24. The shutter 35 is movable with respect to the piston 24 along the central axis X24. The central channel 244 extends around the central axis X24 and provides a fluid communication between the chamber 166 and the chamber 22. The pressure regulator 14 comprises a spring 39 that pushes the shutter 35 to close the central channel 244 unless the pressure between the pressure regulator 14 and the air compressor 8 becomes superior to the first threshold T1.

When the air tank 10 is full, the piston 24 is moved towards the closed position of the pressure regulator 14, as shown on FIG. 3. In this configuration, the collar 240 is in contact with the seat 160, and the shutter 35 is pushed against the collar 240, preventing fluid communication between the chamber 166 and the chamber 22. If the intake pressure P8, which exists in the outlet port 20, increases above the first threshold T1, the piston 24 goes further downwards along arrow A3 thanks to a freedom in translation along the axis X24 of a central tubular portion 246 of the piston 24, which surrounds the central channel 244, with respect to the collar 240. The piston 24 is pushed further in the chamber 22 to such a point that the tubular portion 246 is driven away from the shutter 35. This creates a fluid communication between the outlet port 20 and the central channel 244. Excess air pressure can therefore flow in the central channel 244 from the outlet port 20, as shown by arrow A5. Excess air pressure is also returned to the outlet port 20 via the calibrated hole 162 under action of the spring 26.

Compressed air flowing in the central channel 244 flows in the chamber 22, which comprises air vents 220 allowing release of the air contained in the chamber 22 to the atmosphere, as shown by arrows A6. The portion of the chamber 22 located on the side of the active surface 242 is sealed from the atmosphere by a sealing gasket 222.

Figure 5:
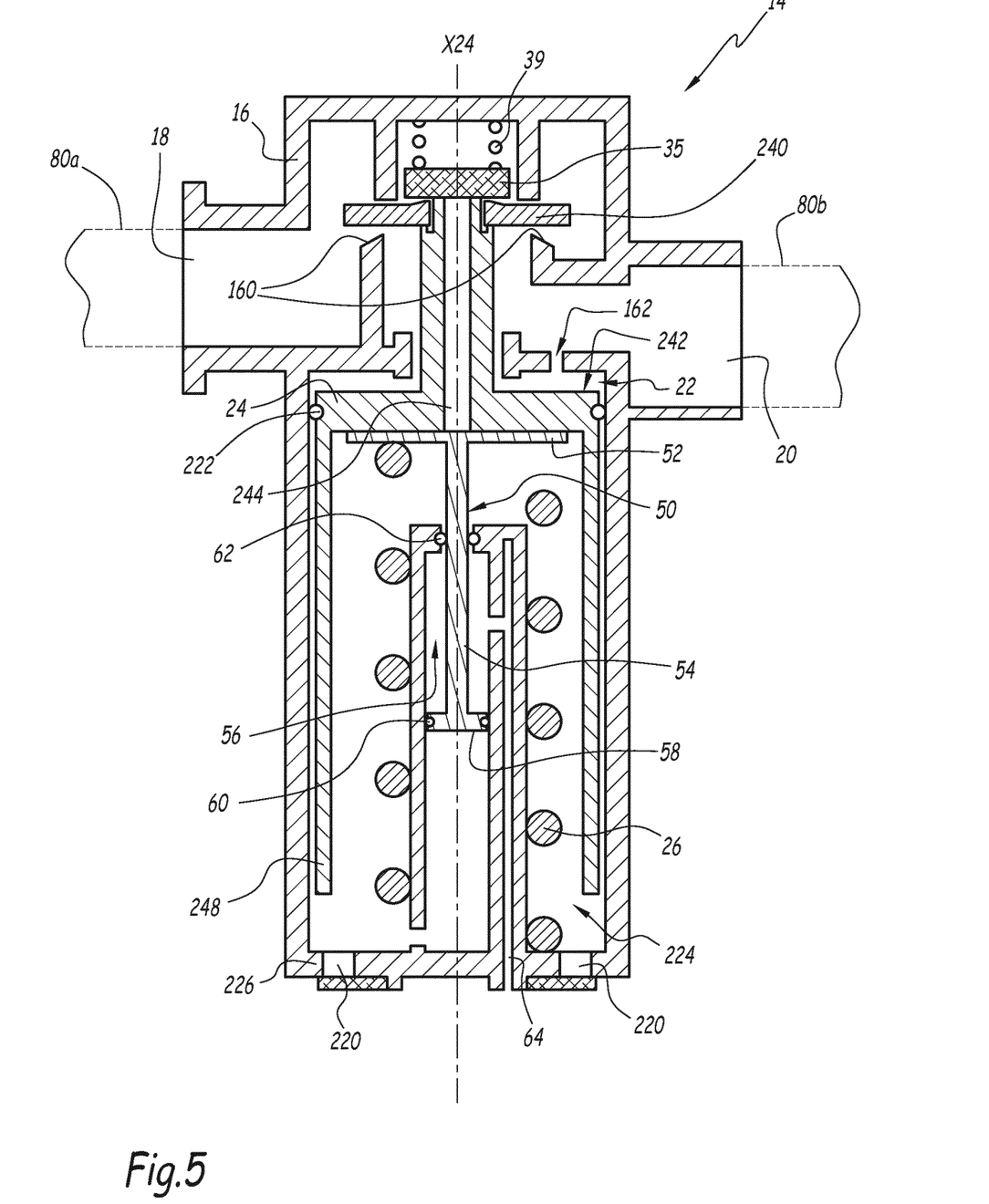
FIGS. 5 to 7 are transversal sectional views of a pressure regulator of a compressed air generation system according to a second embodiment
Figure 6:
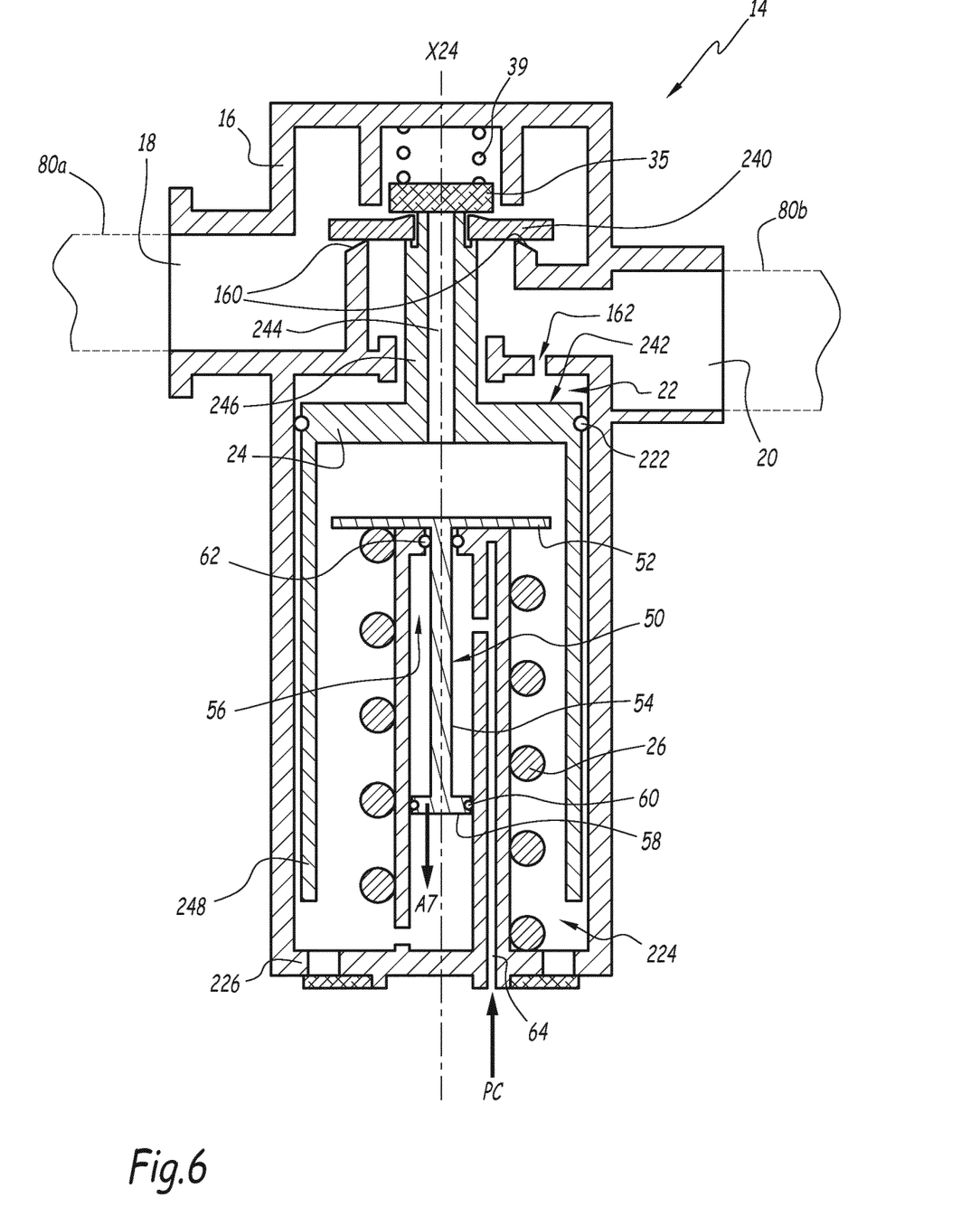
Figure 7:
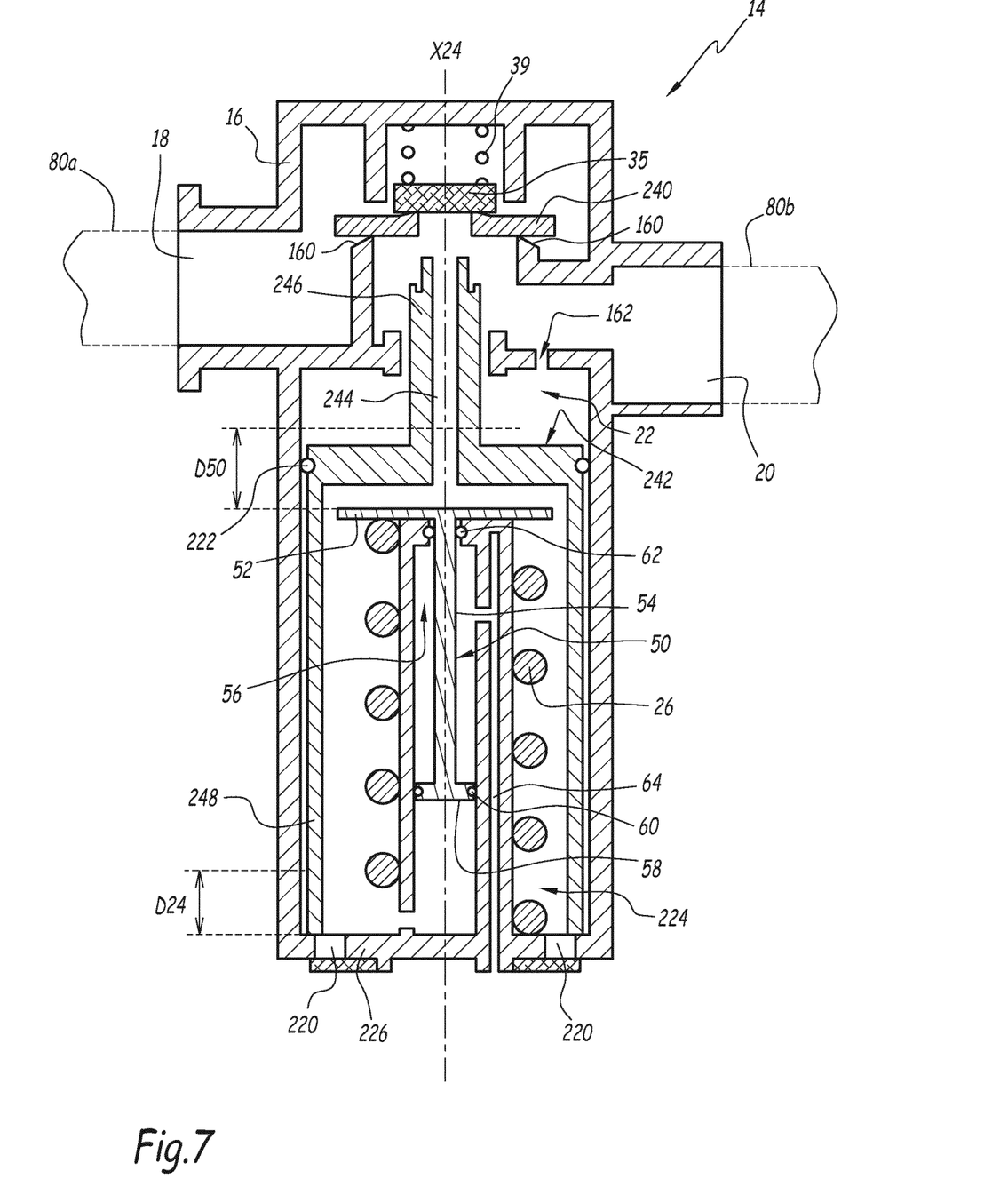

A second embodiment of the invention is represented on FIGS. 5 to 7, the pressure relief valve of the pressure regulator may be adapted to open when the pressure regulator 14 is closed, and when the intake pressure P8 between the pressure regulator 14 and the air compressor 8 becomes superior to a second threshold T2 inferior to the first threshold T1. The second threshold T2 may be, for example, 2 bar. The features common with the pressure regulator of the first embodiment have the same references and work in the same way.

In the pressure regulator of FIG. 5, there is no pressure controlled piston 32 on the upper side of the valve body 16. Instead the pressure regulator 14 comprises a pressure controlled piston 50 located within a lower side 224 of the pressure chamber 22. The piston 50 comprises an upper plate 52 which is put into contact with the piston 24 by the spring 26. In this case, there is no screw 28 represented, however the pressure regulator may comprise such a screw. The plate 52 closes the central channel 244.

The piston 50 comprises a rod 54 which is partially inserted into an auxiliary chamber 56 located inside the lower side 224 of the chamber 22. In the auxiliary chamber 56, the piston 50 is terminated by a head 58, comprising a sealing gasket 60. Another sealing gasket 62 is provided around the rod 54 to tighten the auxiliary chamber 56.

The pressure regulator 14 comprises a duct 64 which provides fluid communication between the auxiliary chamber 56 and the outside of the pressure regulator 14, allowing a control pressure to be exerted in the auxiliary chamber 56.

In the embodiment of FIG. 5, the piston 24 comprises a peripheral wall 248 which extends downwards, and which is located radially outwards with respect to the spring 26.

The working principle of the pressure regulator 14 is described on FIGS. 5 to 7. On FIG. 5, the pressure regulator 14 functions in a pressure regulation only mode: pressure peaks in the inlet port 18 induce downwards movements of the piston 24, reducing the fluid passage between the collar 240 and the seat 160. In this configuration, the peripheral wall 248 is raised with respect to a bottom wall 226 of the chamber 22.

On FIG. 6, a control pressure PC is applied in the duct 64. The pressure increase in the auxiliary chamber 56 induces a downward movement, along arrow A7, of the piston 50, against the force of the spring 26. The plate 52 is not anymore in contact with the piston 24. The piston 24 is therefore free to be pushed downwards by the spring 39, via the shutter 35. Under action of the spring 39, the shutter 35 and the piston 24, the collar 240 is pushed against the seat 160 to achieve forced closure of the pressure regulator 14 (Mode closed). In such a case, the pressure-controlled piston 50 closes the pressure regulator 14 in an indirect way using the force of the spring 39.

In this configuration, the peripheral wall 248 has been moved closer to the bottom wall 226, but the piston 24 is still free to move downwards.

On FIG. 7, a pressure peak occurs in the outlet port 20 whereas the valve is forced in a closed position (Mode closed on FIG. 4). Through the hole 162, the pressure is exerted on the surface 242 of the piston 24. Due to the fact that the spring 26 does not push the piston 24 upwards anymore, the piston 24 can be moved downward at a pressure threshold T2 inferior to T1, provoking opening of the central channel 244 and purging of fluid through the channel 244 and the air vents 220. The piston 24 may move downwards until the peripheral wall 248 comes into abutment with the bottom wall 226.

The travel of the piston 24 from its position of FIG. 5 towards its position of FIG. 7 is allowed by the fact that the piston 50 has a running distance D50 superior to the running distance D24 of the piston 24. The plate 52 of the piston 50 does therefore not limit the piston 24 when the piston 24 move further downwards to open the pressure relief valve.

The pressure control of the piston 50 may also be controlled via the control unit 34.

The intake pressure P8 therefore remains steady at the value T2. This pressure relief valve allows reducing the pressure between the pressure regulator 14 and the air compressor 8, to avoid creation by the air compressor 8 a resisting couple on the crankshaft of the engine 2.

Figure 8:
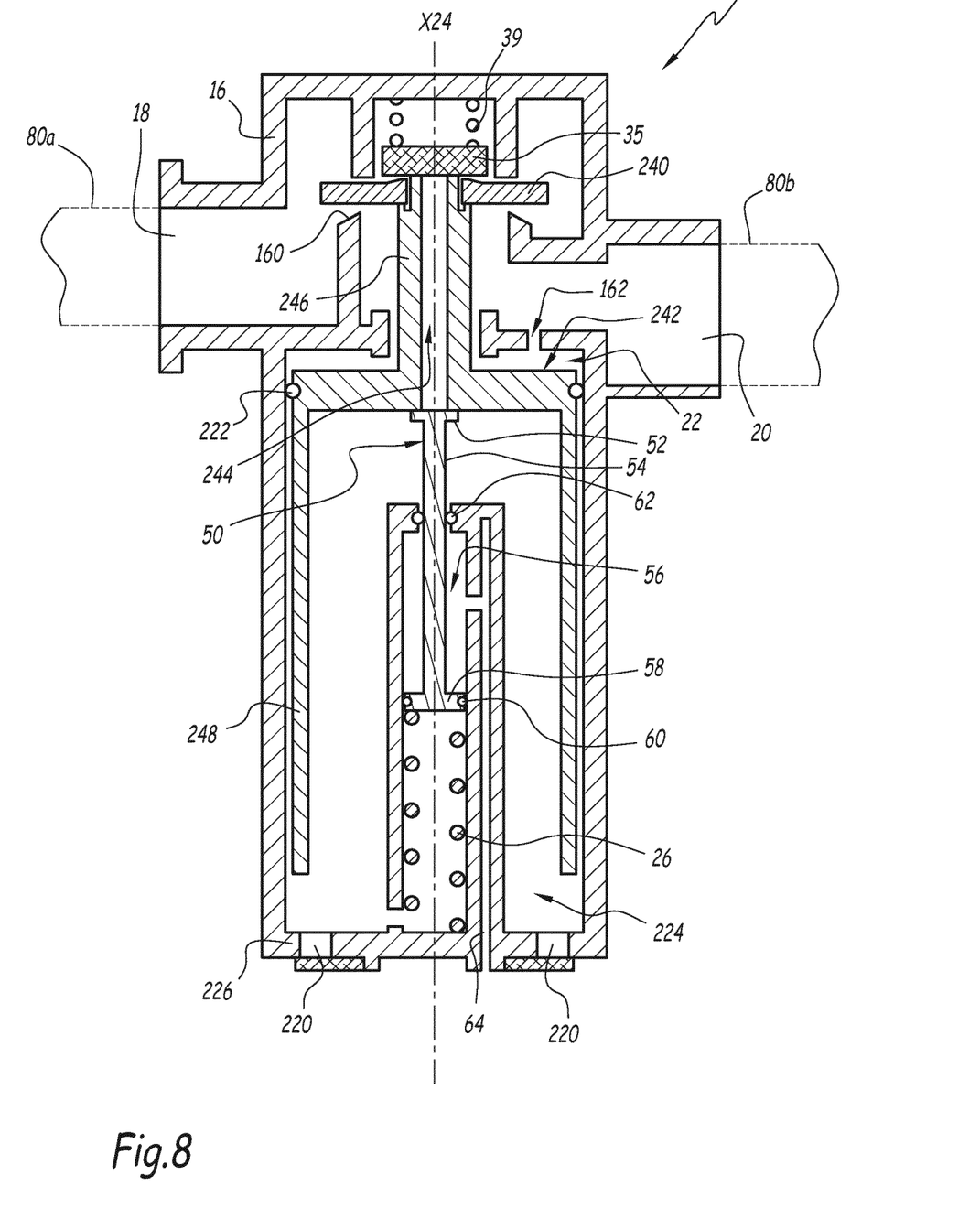
FIG. 8 is a transversal sectional view of a variant of the pressure regulator of FIGS. 5 to 7.

According to a variant represented on FIG. 8, the spring 26 may be housed in the auxiliary chamber 56 instead of being housed within the low side 224 of the chamber 22. In such a case the plate 52 of the piston 50 has a reduced width with respect to the axis X24. The spring 26 is mounted between the head 58 and the bottom wall 226.

According to an embodiment, the pressure relief valve may be distinct from the pressure regulator 14, and formed by a valve 7 connected on the second section 80*b*, for example a three-way valve.

According to an optional embodiment, the vehicle V may comprise an exhaust after-treatment system (EATS) 9 provided on the exhaust line 6 and adapted to reduce particulates in the exhaust gases. To operate properly, the EATS 9 must be cleaned from times to times by warming up at a temperature around 450° C. To obtain this temperature, the exhaust gases can be warmed up by reducing the quantity of fresh air provided by the turbocompressor 4 in the air intake pipe 44. This can be done by opening the pressure regulator 14 at a time when it is closed so that compressed air delivered by the turbocompressor 4 will not be delivered to the engine 2, provoking an increase of the exhaust gases temperature. The compressed air tanks generally have a pressure varying between a cut-in threshold and a cut-off threshold (corresponding to the maximal pressure Pmax), which can be for example 11 bar and 12 bar. These thresholds can be changed during operation of the air tank 10, for example increased by 0.5 bar during an operation period when energy is free because the vehicle V is braking. By setting the cut-in and cut-off thresholds to higher values, the air compressor 8 becomes able to compress more air in the air tank 10, and compressed air is therefore drawn from the air intake pipe 44. This reduces the quantity of fresh air in the intake side of the engine 2, thereby increasing the temperature of the exhaust gases and reducing the warming time of the EATS 9.

The compressed air generation system 12 may also comprise a discharge valve 17, connected on the outlet pipe 82, and allowing evacuating air pressure downstream the air compressor 8 to avoid an overpressure in the air tank 10. This may avoid having to act on the operating parameters of the air tank 10. The discharge valve 17 may be controlled by the control unit 34.

The forced opening of the pressure regulator may be obtained by cutting the pressure control of the piston 32 commanded by the control unit 34. The setting of the pressure thresholds of the air tank 10 may be operated by an electric signal emitted by the control unit 34 towards the air tank 10.

The technical features of the embodiments and variants described above may be combined to form new embodiments of the invention.

The invention claimed is:

1. Compressed air generation system for an automotive vehicle, comprising: a turbocompressor feeding an internal combustion engine of the automotive vehicle with compressed air, an air compressor, at least one compressed air tank connected to an outlet pipe of the air compressor, the air compressor comprising an inlet pipe fed with compressed air from the turbocompressor, wherein the compressed air generation system comprises a pressure regulator placed downstream the turbocompressor and upstream the air compressor and which limits the pressure of the compressed air fed from the turbocompressor to the air compressor to a first threshold, wherein an outlet pressure of the pressure regulator is lower than the first threshold if an inlet pressure of the pressure regulator is higher than the first threshold, wherein the compressed air generation system comprises a tank sensor adapted to detect the quantity of compressed air contained in the air tank, and a control valve adapted to close the feeding of the inlet pipe of the air compressor with the turbocompressor if the tank sensor detects that the air tank is full, wherein the control valve is formed by the pressure regulator that can be closed, and wherein the pressure regulator comprises a controllable actuator adapted to close the pressure regulator regardless of the pressure upstream of the pressure regulator and the pressure downstream of the pressure regulator.

2. Compressed air generation system according to claim 1, wherein the controllable actuator is a pressure-controlled piston which closes the pressure regulator.

3. Compressed air generation system according to claim 2, wherein in the absence of control pressure acting on the pressure controlled piston, the pressure regulator is open.

4. Compressed air generation system according to claim 1, wherein the control valve is a valve connected on the inlet pipe of the air compressor upstream the pressure regulator.

5. Compressed air generation system according to claim 1, wherein the air compressor is able to be stopped or placed in a rest mode when the tank sensor detects that the air tank is full.

6. Compressed air generation system according to claim 1, wherein the compressed air generation system comprises a pressure relief valve adapted to release to the atmosphere compressed air accumulated between the pressure regulator and the air compressor.

7. Compressed air generation system according to claim 6, wherein the pressure relief valve is provided in the pressure regulator and formed by a shutter and a part of a piston of the pressure regulator that is movable with respect to the shutter under action of the pressure between the pressure regulator and the compressor, and wherein when the pressure regulator is closed and when the pressure between the pressure regulator and the air compressor becomes superior to a second threshold, inferior to the first threshold, a central channel of the part of the movable piston, that communicates with the atmosphere, is open by a movement of the part of the movable piston away from the shutter.

8. Compressed air generation system according to claim 6, wherein the pressure relief valve is formed by a valve connected on the inlet pipe of the air compressor downstream the pressure regulator.

9. Compressed air generation system according to claim 1, wherein the pressure regulator is connected to the inlet pipe of the air compressor.

10. Compressed air generation system according to claim 1, further comprising a discharge valve connected on the outlet pipe of the air compressor which is opened during forced opening of the pressure regulator and activation of the air compressor.

11. Compressed air generation system according to claim 1, further comprising a control unit including electronic and/or pneumatic components for controlling at least:
- a control valve adapted to close the feeding of the inlet pipe of the air compressor with the turbocompressor if a tank sensor of the compressed air generation system detects that the air tank is full;
- the operation of the air compressor;
- a pressure relief valve adapted to release to the atmosphere compressed air accumulated between the pressure regulator and the air compressor;
- cut-in and cut-off pressure thresholds of the air tank; and
- a discharge valve connected on the outlet pipe of the air compressor which is opened during forced opening of the pressure regulator and activation of the air compressor.

12. An automotive vehicle, such as a truck, comprising a compressed air generation system according to claim 1.

13. Compressed air generation system for an automotive vehicle, comprising: a turbocompressor feeding an internal combustion engine of the automotive vehicle with compressed air, an air compressor, at least one compressed air tank connected to an outlet pipe of the air compressor, the air compressor comprising an inlet pipe fed with compressed air from the turbocompressor, wherein the compressed air generation system comprises a pressure regulator placed downstream the turbocompressor and upstream the air compressor and which limits the pressure of the compressed air fed from the turbocompressor to the air compressor to a first threshold, wherein the compressed air generation system comprises a tank sensor adapted to detect the quantity of compressed air contained in the air tank, and a control valve adapted to close the feeding of the inlet pipe of the air compressor with the turbocompressor if the tank sensor detects that the air tank is full, wherein the compressed air generation system comprises a pressure relief valve adapted to release to the atmosphere compressed air accumulated between the pressure regulator and the air compressor, wherein the pressure relief valve is provided in the pressure regulator and formed by a shutter and a part of a piston of the pressure regulator that is movable with respect to the shutter under action of the pressure between the pressure regulator and the compressor, and wherein when the pressure regulator is closed and when the pressure between the pressure regulator and the air compressor becomes superior to a second threshold, inferior to the first threshold, a central channel of the part of the movable piston, that communicates with the atmosphere, is open by a movement of the part of the movable piston away from the shutter.

* * * * *